(12) United States Patent
Katayama et al.

(10) Patent No.: US 11,940,719 B2
(45) Date of Patent: Mar. 26, 2024

(54) LIGHT SOURCE DEVICE, PROJECTOR AND LIGHT INTENSITY DISTRIBUTION UNIFORMIZATION METHOD

(71) Applicant: Sharp NEC Display Solutions, Ltd., Tokyo (JP)

(72) Inventors: Hiromi Katayama, Tokyo (JP); Shinichiro Chikahisa, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 221 days.

(21) Appl. No.: 17/609,725

(22) PCT Filed: Jul. 12, 2019

(86) PCT No.: PCT/JP2019/027640
§ 371 (c)(1),
(2) Date: Nov. 8, 2021

(87) PCT Pub. No.: WO2021/009791
PCT Pub. Date: Jan. 21, 2021

(65) Prior Publication Data
US 2022/0214606 A1 Jul. 7, 2022

(51) Int. Cl.
*G03B 21/00* (2006.01)
*G03B 21/20* (2006.01)

(52) U.S. Cl.
CPC ....... *G03B 21/204* (2013.01); *G03B 21/2013* (2013.01); *G03B 21/208* (2013.01)

(58) Field of Classification Search
CPC . G03B 21/204; G03B 21/2013; G03B 21/208
See application file for complete search history.

(56) References Cited

U.S. PATENT DOCUMENTS

2009/0040753 A1* 2/2009 Matsumoto ........ G03B 21/2013
362/227
2011/0304826 A1 12/2011 Jeon et al.
(Continued)

FOREIGN PATENT DOCUMENTS

JP 2005-221872 A 8/2005
JP 2012-203390 A 10/2012
(Continued)

OTHER PUBLICATIONS

International Search Report (ISR) (PCT Form PCT/ISA/210), in PCT/JP2019/027640, dated Aug. 27, 2019.

*Primary Examiner* — Gerald J Sufleta, II
(74) *Attorney, Agent, or Firm* — MCGINN I.P. LAW GROUP, PLLC

(57) ABSTRACT

A light source device for generating excitation light that is irradiated to a phosphor includes: a plurality of light sources that emits laser light; and a microlens array that includes a plurality of microlenses arranged in two directions orthogonal to each other, that is incident the laser light emitted from the light source, and that irradiates the phosphor with the output light as an excitation light. The light source image of the light source at the irradiated surface of the microlens array is elliptical, and the long axis direction of the light source image intersects with both the two directions. A coordinate system includes: a first axis that is parallel to a principal ray of the laser light incident on the microlens array; and a second axis, in a direction in which the laser light emitted from the microlens array or the fluorescence emitted from the phosphor is reflected.

10 Claims, 10 Drawing Sheets

(56) References Cited

U.S. PATENT DOCUMENTS

| 2014/0211170 | A1* | 7/2014 | Kitano | G03B 21/204 |
| | | | | 353/31 |
| 2018/0252993 | A1* | 9/2018 | Akiyama | G03B 21/204 |
| 2019/0243225 | A1* | 8/2019 | Akiyama | H01S 5/4093 |
| 2019/0391474 | A1* | 12/2019 | Akiyama | G03B 21/2013 |
| 2020/0103739 | A1* | 4/2020 | Chang | G03B 21/2066 |

FOREIGN PATENT DOCUMENTS

| JP | 2016-062038 A | 4/2016 |
| JP | 2017-083900 A | 5/2017 |
| JP | 2018-017816 A | 2/2018 |
| JP | 2018-146806 A | 9/2018 |

\* cited by examiner

LIGHT SOURCE DEVICE, PROJECTOR AND LIGHT INTENSITY DISTRIBUTION UNIFORMIZATION METHOD

TECHNICAL FIELD

The present invention relates to a light source device, a projector including the light source device and a light intensity distribution uniformization method for irradiating light having a uniform intensity distribution from the light source device to a specific irradiated surface.

BACKGROUND OF THE INVENTION

In a projector for projecting a color image, a system is known in which white light emitted from a light source is separated into three primary colors of red, green and blue using a dichroic mirror or a color wheel that rotates at a high speed, and a color image is formed by optical modulating according to a video signal for each separated color light. Liquid crystal panels or DMDs (Digital Micromirror Device) are used for image forming devices used for optical modulating.

In the above-described projector, conventionally, a configuration in which a high brightness discharge lamp or the like is used as a light source is mainly used. However, in recent years, in order to extend product life and low power consumption of a light source, a projector using a semiconductor device such as a laser diode (hereinafter, referred to as LD) or an LED (Light Emitting Diode) as the light source has been developed.

When a semiconductor device is used as a light source, usually because the semiconductor device can only emit a single wavelength light, there is a configuration in which the color light emitted from the light source irradiates to a phosphor as excitation light and the colored lights not directly obtained from the light source are emitted by the phosphor, respectively. For example, when a blue LD that emits laser light having a peak wavelength in a blue wavelength region is used as a light source, red light and green light are emitted by using the phosphors. In some projectors, there is a configuration in which individual phosphors that emit red and right are not used but a phosphor that emits yellow light including red and green components is used. The yellow light, or the red light and the green light emitted by the phosphors are synthesized with the blue light emitted from, for example, the blue LD to convert into white light which is used as illumination light for irradiating the image forming device.

In the configuration using the LD in the light source described above, in order to output a higher brightness light from the light source, it is sufficient to increase the light output (optical power) by increasing the number of LDs. In general, the laser light emitted from the LD is a shape extending in an elliptical cone shape, a cross section orthogonal to the optical axis becomes an elliptical shape having a narrow width in the short axis direction. For example, when a plurality of LDs arranged in a lattice shape is used, a plurality of light source images formed by each laser light will be shown in FIG. 10.

When light from a light source having such a non-uniformity intensity distribution is used, for example, as excitation light for irradiating a phosphor, the luminous efficiency of the phosphor is lowered. Generally, it is known that the luminous efficiency of a phosphor depends on the temperature, and the luminous efficiency decreases when the temperature is high. Therefore, when excitation light having a peak local to the intensity distribution of light is irradiated to the phosphor, the temperature rises at the portion irradiated with the peak light, and light having a low intensity is irradiated at the other portion, so that the luminous efficiency of the phosphor is lowered.

Furthermore, when illumination light including light from a light source having a non-uniform intensity distribution is irradiated to the image forming device, it causes color unevenness and luminance unevenness in the projected image.

Therefore, in a projector using LD as a light source, it is necessary to convert the light from the light source having a non-uniform intensity distribution into light having a uniform intensity distribution on a specific irradiated surface.

As a method of making uniform the light intensity distribution in the irradiated surface, a method of using a diffusion plate, a method of using a rod integrator or a light tunnel, a method of using a microlens array or the like is known. For example, Patent Document 1 describes a configuration in which the intensity distribution of illumination light irradiated from a light source having an LD to an image forming device is made uniform by using a microlens array.

RELATED ART DOCUMENTS

Patent Documents

Patent Document 1: JP 2016-062038 A

SUMMARY

Problem to be Solved by the Invention

The microlens array is a configuration which comprises a plurality of microlenses (hereinafter, referred to as cells) arranged in two directions orthogonal to each other. As shown in FIG. 11A, on the irradiated surface of the microlens array, if the cells that have sufficiently small with respect to the size of each light source image formed by the laser light are formed, it is possible to increase the uniformity of the light illumination intensity distribution in the irradiated surface as shown in FIG. 11B. However, when the cells are small, edge sagging occurs at the time of manufacture, and the ratio of the ridge line portions formed between the cells increases with the increase in the number of cells. Since the light passing through such the ridge line portions are not subjected to a lens effect, the light utilization efficiency is lowered in the microlens array having the small cells. That is, there is a limit in the manufacturing in the miniaturization of the cells of the microlens array.

As described above, the light source image of the laser light emitted from the LD is elliptical having a narrow width in the short axis direction. When a microlens array having large cells at a certain level with respect to the size of the light source image is used as shown in FIG. 12A, the uniformity of the intensity distribution of light caused by the shape of the light source image in the irradiated surface is reduced as shown in FIG. 12B. This becomes more pronounced as the cells become larger for the size of the light source image in the irradiated surface of the microlens array.

Patent Document 1, when the coherent laser light is incident on the microlens array, the interference fringes are formed on the microlens array, points out a problem in which the interference fringes are superimposed on the same position on the image forming device to become an interference fringe pattern, and proposes a configuration for reducing the occurrence of the interference fringe pattern. The art described in Patent Document 1 does not improve the non-uniformity of the light intensity distribution on the irradiated surface caused by the shape of the light source image.

Even if a means for improving the non-uniformity of the light intensity distribution on the irradiated surface is newly installed, for example, in the light source device for excitation light irradiated on the phosphor, it is desirable to reduce structural problems to a mechanism and apparatus associated with the light source device such as a mechanism for fixing the light source for the excitation light and position of a cooling fan for blowing to the light source.

Also, in the light source device for illuminating light that is irradiated to the image forming device, it is desirable to reduce structural problems to a mechanism and apparatus of an optical system for projecting the image light formed from the illumination light output from the light source according to the video signal.

The present invention has been made to solve the problems of the background art as described above, it is an object of the present invention to provide a light source device, a projector and a light intensity distribution uniformization method that can improve the non-uniformity of the light intensity distribution in a specific irradiated surface caused by the shape of the light source image while reducing structural problems.

Means for Solving the Problems

In order to achieve the above object, an exemplary aspect of the light source device of the present invention is a light source device for generating excitation light that is irradiated to a phosphor, comprising:
    a plurality of light sources that emits laser light; and
    a microlens array that comprise a plurality of microlenses arranged in two directions orthogonal to each other, that is incident the laser light emitted from the light source, and that irradiates the phosphor with the output light as an excitation light, wherein:
    the light source image of the light source on the irradiated surface of the microlens array is elliptical;
    the long axis direction of the light source image intersects with both the two directions; and
    in a coordinate system comprising: a first axis that is parallel to a principal ray of the laser light incident on the microlens array; a second axis, in a direction in which the laser light emitted from the microlens array or the fluorescence emitted from the phosphor is reflected, that is an orthogonal direction to the first axis; and a third axis that is orthogonal to the first axis and the second axis, respectively,
    the two directions intersect with the direction of the second axis and the direction of the third axis, respectively.

Otherwise, an exemplary aspect of the light source device of the present invention is a light source device for generating incident light of a microlens array that comprises a plurality of microlenses arranged in two directions orthogonal to each other and that irradiates an image forming device, that performs optical modulation, with the output light, comprising:
    a plurality of light sources that emits laser light, wherein:
    the light source image of the light source on the irradiated surface of the microlens array is elliptical;
    the long axis direction of the light source image intersects with both the two directions; and
    in a coordinate system comprising: a first axis that is parallel to a principal ray of the laser light incident on the microlens array; a second axis, in a direction in which the laser light emitted from the microlens array or the fluorescence emitted from the phosphor is reflected, that is an orthogonal direction to the first axis; and a third axis that is orthogonal to the first axis and the second axis, respectively,
    the two directions are parallel to the direction of the second axis or the direction of the third axis, respectively.

Otherwise, an exemplary aspect of the light source device of the present invention is a light source device for generating incident light of a first microlens array that comprises a plurality of microlenses arranged in two directions orthogonal to each other and that irradiates an image forming device, that performs optical modulation, with the output light, comprising:
    a plurality of first light sources that emits laser light and that irradiates the first microlens array with the output light;
    a plurality of second light sources that emits laser light; and
    a second microlens array that comprises a plurality of microlenses arranged in a third direction and a fourth direction orthogonal to each other, and that is iradiated the laser light emitted from the second light source, and that irradiates a phosphor with the output light, wherein:
    the light source image of the first light source on the irradiated surface of the first microlens array is elliptical;
    the long axis direction of the light source image of the first light source intersects with both the first direction and the second direction;
    the light source image of the second light source on the irradiated surface of the second microlens array is elliptical;
    the long axis direction of the light source image of the second light source intersects with both the third direction and the fourth direction; and
    the first direction and the second direction intersect with both the third direction and the fourth direction.

An exemplary aspect of the projector of the present invention is a projector comprising:
    any one of the above light source devices; and
    a projection optical system that projects an image light formed from the emitted light of the light source device.

An exemplary aspect of the light intensity distribution uniformization method of the present invention is a light intensity distribution uniformization method for uniformizing the intensity distribution of excitation light irradiated to a phosphor in a light source device that comprises:
    a plurality of light sources that emits laser light; and
    a microlens array that comprise a plurality of microlenses arranged in two directions orthogonal to each other, that is incident the laser light emitted from the light source, and that irradiates the phosphor with the output light as an excitation light,
    wherein the light source image of the light source at the irradiated surface of the microlens array is elliptical,
    wherein the long axis direction of the light source image intersects with both the two directions,
    in a coordinate system comprising: a first axis that is parallel to a principal ray of the laser light incident on the microlens array; a second axis, in a direction in which the laser light emitted from the microlens array or the fluorescence emitted from the phosphor is reflected, that is an orthogonal direction to the first axis; and a third axis that is orthogonal to the first axis and the second axis, respectively, the light intensity distribution uniformization method comprising the steps of:

arranging the microlens array so that the two directions intersect with the direction of the second axis and the direction of the third axis, respectively; and irradiating the phosphor with the light emitted from the microlens array as an excitation light.

Otherwise, an exemplary aspect of the light source device of the present invention is a light intensity distribution uniformization method for uniformizing the intensity distribution of illumination light that is irradiated an image forming device from a light source device for generating incident light of a microlens array that comprises a plurality of microlenses arranged in two directions orthogonal to each other and that irradiates the image forming device, which performs optical modulation, with the output light, wherein the light source device further comprises a plurality of light sources that emits laser light, wherein the light source image of the light source on the irradiated surface of the microlens array is elliptical, wherein the long axis direction of the light source image intersects with both the two directions, in a coordinate system comprising: a first axis that is parallel to a principal ray of the laser light incident on the microlens array; a second axis, in a direction in which the laser light emitted from the microlens array or the fluorescence emitted from the phosphor is reflected, that is an orthogonal direction to the first axis; and a third axis that is orthogonal to the first axis and the second axis, respectively, the light intensity distribution uniformization method comprising the steps of:

arranging the microlens array so that the two directions are parallel to the direction of the second axis or the direction of the third axis, respectively; and irradiating the image forming device with the light emitted from the microlens array.

Effect of the Invention

According to the present invention, it is possible to improve the non-uniformity of the light intensity distribution on a specific irradiated surface caused by the shape of the light source image while reducing a structural problem.

EXEMPLARY EMBODIMENT

Next, the present invention will be described with reference to the accompanying drawings.

First Exemplary Embodiment

Figure 1:
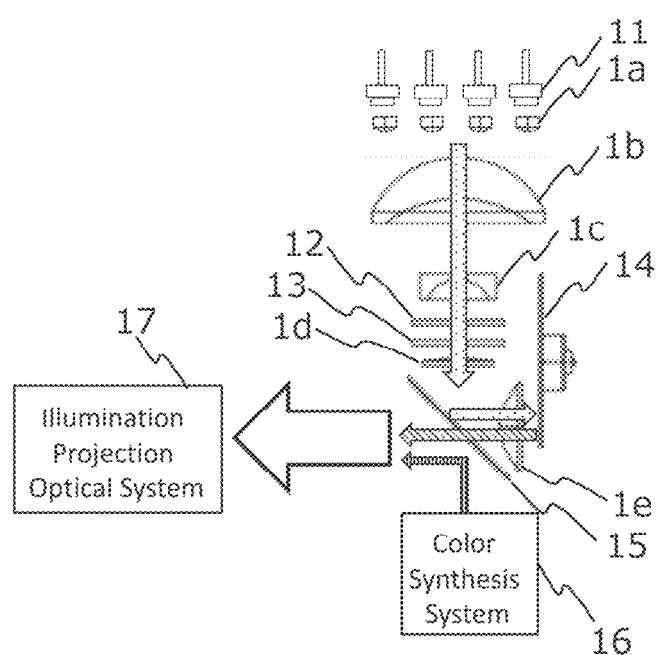
FIG. 1 is a schematic diagram showing an example of a configuration of a light source device included in a projector.

FIG. 1 is a schematic diagram showing an example of a configuration of a light source device included in a projector.

Figure 2:
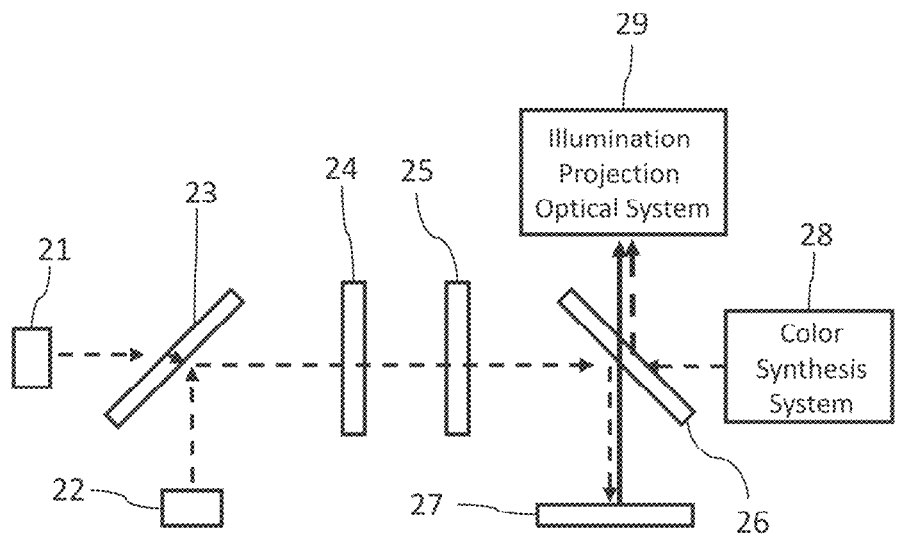
FIG. 2 is a schematic diagram showing another configuration example of a light source device included in a projector.

FIG. 1 shows an example of the optical system included in a projector, the number of lenses, mirrors and the like is not limited to the number shown in FIG. 1, may be increased or decreased as necessary. Furthermore, FIG. 1 shows a configuration example of irradiating a laser light emitted from the LD to a ring-shaped phosphor fixed on the phosphor wheel rotating at a high speed as excitation light. The phosphor is not limited to a configuration in which it is fixed on the phosphor wheel, and may be fixed to a predetermined portion that does not have a rotation mechanism or a movement mechanism as shown in FIG. 2 to be described later.

The light source device shown in FIG. 1 comprises a plurality of LDs 11, a plurality of collimator lenses 1a, lenses 1b, 1c, 1d and 1e, two sets of microlens arrays 12 and 13, phosphor wheel 14, dichroic mirror 15, and a color combining system 16. Although four light sources (LDs 11) are shown in FIG. 1, any number of LDs 11 may be used as long as the number is one or more. The plurality of light sources includes a case where the laser light emitted from the LD is divided into a plurality of light sources.

Laser lights emitted from a plurality of LDs 11 are converted into parallel luminous flux, respectively, by the collimator lens 1*a*, the converted lights are condensed by the lens 1*b* and 1*c* and are incident on microlens array 12 and 13. Light emitted from microlens array 13 is condensed by the lens 1*d*, and is incident on dichroic mirror 15.

Microlens array 12 which is the incident side divides the light flux of the incident light, microlens array 13 which is the emitting side forms an image each divided light flux on the irradiated surface, microlens arrays 12 and 13 thereby convert the intensity distribution the incident light into uniform light on a predetermined irradiated surface.

Microlens arrays 12 and 13 are configured to include a plurality of cells arranged in two directions orthogonal to each other. Each of the plurality of cells has a square shape or a rectangular shape, and are arranged in a lattice shape or a staggered shape, for example. The lens included in each cell is a plano-convex lens or a biconvex lens, the lens shape may be square, rectangular or circular. If each cell is formed by a plano-convex lens, the convex surface may be the incident surface side of the light or may be the emitting surface side of the light. When providing the convex surface to the incident surface side and the emitting surface side of the light, respectively, two microlens arrays 12 and 13 may be integrally formed. The shape of microlens arrays 12 and 13 may match the shape of the irradiated surface and may be square, rectangular or circular. The size of microlens arrays 12 and 13 may be the size to be incident all the light source image formed by a laser light emitted from a plurality of LDs 11.

Dichroic mirror 15, for example, has a characteristic of passing through a wavelength light longer than a predetermined wavelength, and reflecting a wavelength light shorter than the predetermined wavelength. In the specification, it is assumed that dichroic mirror 15 reflects the laser light (excitation light) emitted from LD 11 and passes through the light emitted by the phosphor on phosphor wheel 14. Light (excitation light) which is incident on dichroic mirror 15 is reflected in the direction of phosphor wheel 14, is condensed by lens 1*e*, and is irradiated to the phosphor on phosphor wheel 14.

Phosphor wheel 14 emits light (e.g., yellow light) having wavelengths different from those of the excitation light (e.g., blue light) from the excitation light (e.g., blue light) emitted from LD 11. Phosphor wheel 14, by rotating at a high speed by a motor (not shown), reduces the temperature rise of the phosphor by moving the irradiated position of the excitation light, and efficiently cools the phosphor. The light emitted by the phosphor passes through the lens 1*e*, and is incident on dichroic mirror 15, and passes through dichroic mirror 15.

In the first exemplary embodiment, since white light is emitted from the light source device, color light which is insufficient for the synthesis of white light and which is different from the color light emitted by the phosphor is generated by color synthesis system 16. For example, when yellow light is emitted by a phosphor, blue light may be emitted by color synthesis system 16. In this case, color synthesis system 16 may be configured to include a blue LD, a diffusion plate for diffusing the laser light emitted from the blue LD, a lens or the like for irradiating dichroic mirror 15 by condensing the light emitted from the diffusion plate. If it is provided with a configuration for making uniform the intensity distribution of light emitted from the light source device to the illumination projection optical system 17 to be described later, the diffusion plate does not need to be used. The color light used for the synthesis of the white light may be the same color light as the laser light emitted from LD 11, and the laser light emitted from LD 11 may be used for the synthesis of the white light.

Light emitted from color synthesis system 16 is reflected by dichroic mirror 15 and is synthesized with light that is emitted by the phosphor and that is passed through dichroic mirror 15, and the synthesized light is output from the light source device.

Light (white light) emitted from the light source device is optical modulated for each of the three primary colors of red, green and blue light according to the video signal, and is incident on the illumination projection optical system 17 that projects the image lights formed by the optical modulation.

FIG. 2 is a schematic diagram showing another configuration example of a light source device included in a projector.

The light source device shown in FIG. 2 is a configuration example in which laser lights emitted from two synthetic light source units are synthesized to obtain brighter projection light, and the synthesized light is used as excitation light for irradiating the phosphor with the synthesized light. FIG. 2 only shows a main configuration of the light source device in simplified form, and the light source device may include optical parts such as lens and mirror as needed. FIG. 2 shows an example in which light emitted by two synthetic light source units is synthesized, but light emitted by three or more synthetic light source units may be synthesized.

The light source device shown in FIG. 2 includes two synthetic light source units 21 and 22, synthetic mirror 23, microlens arrays 24 and 25, dichroic mirror 26, phosphor 27 and color synthesis system 28.

Synthetic light source units 21 and 22 are configured to include a plurality of light sources, for example, a plurality of LDs is arranged in a lattice shape.

Figure 3:
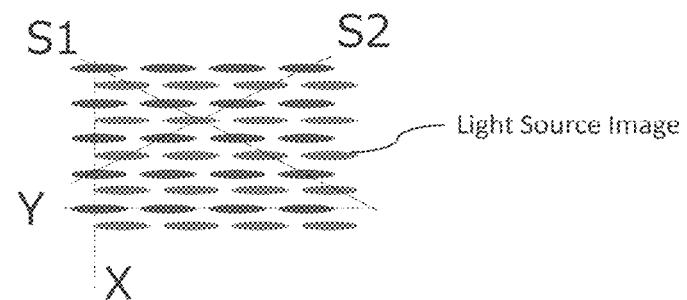
FIG. 3 is a schematic diagram showing an arrangement example of a light source image obtained by the light source device shown in FIG. 2.

Synthetic mirror 23 has a property of passing through light incident on one surface and of reflecting light incident on the other surface. Lights emitted from synthetic light source units 21 and 22 are respectively incident on synthetic mirror 23, and are synthesized by synthetic mirror 23, the synthesized light is incident on microlens array 24 and 25. The light source images after synthesis emitted from synthesis mirror 23 on the irradiated surface of microlens array 24 are arranged in a staggered pattern as shown in FIG. 3, for example.

As described above, microlens arrays 24 and 25 convert the incident light into a uniform light intensity distribution and emit the output light to dichroic mirror 26.

Dichroic mirror 26 has a characteristic of reflecting the light emitted from synthetic light source units 21 and 22 (excitation light) and of passing through light emitted by phosphor 27. Light which is incident on dichroic mirror 26 is reflected and is irradiated onto phosphor 27.

Phosphor 27 is configured to be fixed to a predetermined portion having no rotation mechanism or movement mechanism, and emits light (e.g., yellow light) having a wavelength different from that of the excitation light from the excitation light (e.g., blue light) emitted from synthetic light source units 21 and 22. The light emitted by phosphor 27 is incident on dichroic mirror 26 and passes through dichroic mirror 26.

Since the light source device shown in FIG. 2 emits white light to illumination projection optical system 29, color light different from the color light emitted by phosphor 27, which is insufficient for the synthesis of white light, is generated by color synthesis system 28. For example, when yellow light is emitted by phosphor 27, color synthesis system 28 may emit blue light. Color synthesis system 28 may have the same configuration as that of the color synthesis system 16 shown in FIG. 1.

The emitted light of color synthetic system 28 is reflected by dichroic mirror 26, is incident on illumination projection optical system 29 to synthesize with the light, which is passed through dichroic mirror 26, emitted by phosphor 27.

In such a configuration, the present invention uniforms intensity distribution on a specific irradiated surface by arranging the light source and the microlens array so that the long axis direction of the light source image formed by the laser light on the irradiated surface of the microlens array and the direction in which the cells are aligned are intersected.

For example, a coordinate system is set which includes a first axis parallel to a principal ray of laser light which is incident on the microlens array, a second axis, in the direction in which the laser light emitted from the microlens array or the fluorescence emitted from the phosphor is reflected, in a direction orthogonal to the first axis, and a third axis orthogonal to the first axis and the second axis, respectively. In the example shown in FIG. 4A, for example, the first axis is the Z axis, the second axis is the X axis, and the third axis is the Y axis. Then, in the first exemplary embodiment, the light source is arranged so that the long axis direction of the light source image on the irradiated surface of the microlens array and the two directions of the cells are intersected, the microlens array is arranged so that the two directions in which the cells are aligned intersect with the direction of the second axis and the direction of the third axis, respectively.

Figure 4A:
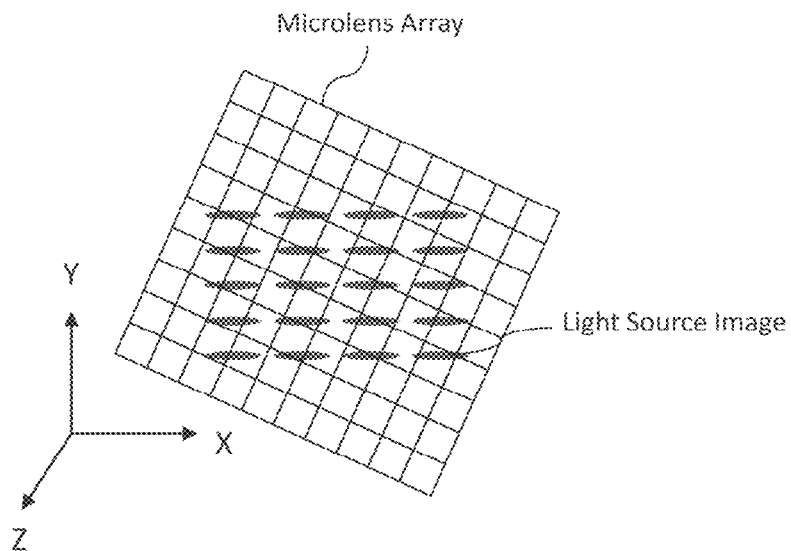
FIG. 4A is a schematic diagram showing an example of the relationship between the light source image and the microlens array of the first exemplary embodiment.

For example, in the configuration shown in FIG. 1, each LD 11 is arranged so that the long axis direction of the light source image on the irradiated surface of the microlens array is along the X-axis shown in FIG. 4A. Then, microlens arrays 12 and 13 are arranged so that the two directions in which the cells are aligned intersect with both the long axis direction and the short axis direction of each light source image.

In the configuration shown in FIG. 2, two synthetic light source units 21 and 22 are arranged so that the long axis direction of each light source image after synthesis at the entrance surface of the microlens array are along the X-axis shown in FIG. 4A, respectively. Then, microlens arrays 24 and 25 are arranged so that two directions in which the cells are aligned intersect with both the long axis direction and the short axis direction of each synthesized light source image.

Hereinafter, the direction in which the cells are aligned may be referred to as a "direction of boundary line of the cells". In the following, the present specification will be described in an example in which the LD and the microlens array are arranged so that the long axis direction of the light source image and the boundary lines or the diagonal lines of the cells are intersected. The LD and the microlens array may be arranged so that the short axis direction of the light source image and the direction of boundary lines or the diagonal lines of the cells are intersected.

Figure 12A:
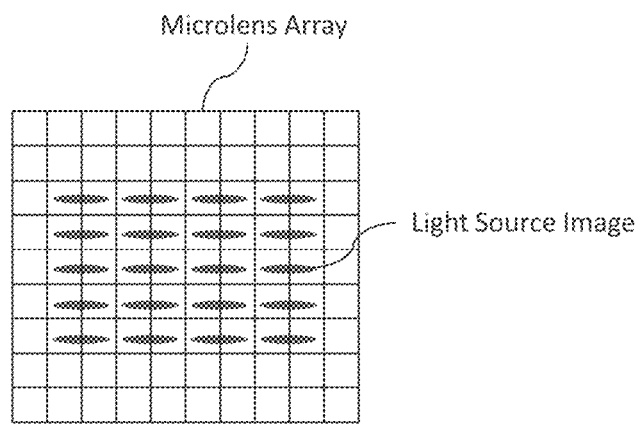
FIG. 12A is a schematic diagram showing another example of the relationship between the light source image and the microlens array of the background art.
Figure 12B:
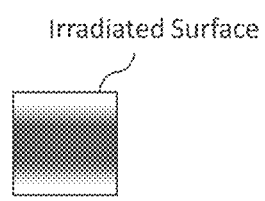
FIG. 12B is a schematic diagram showing an example of the light intensity distribution of the irradiated surface in the relationship between the light source image and the microlens array shown in FIG. 12A.

As shown in FIG. 12A, when the direction of the boundary lines of the cells and the long and short axis directions of the light source image which is incident on the microlens array are parallel, the lights from the light source are relatively uniformly incident on each cell. In this case, since the light having the same intensity distribution from each cell is emitted, in the irradiated surface (imaging surface), due to the elliptical light source image, the light of uneven intensity distribution emitted from each cell is superimposed. Consequently, polarization occurs in the intensity distribution of light in the irradiated surface as shown in FIG. 12B.

Figure 4B:
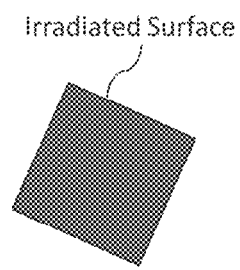
FIG. 4B is a schematic diagram showing an example of the light intensity distribution of the irradiated surface in the relationship between the light source image and the microlens array shown in FIG. 4A.

On the other hand, as shown in FIG. 4A, when the direction of the boundary lines of the cells intersects with the long axis direction and the short axis direction of the light source image, the lights from the light source are never uniformly incident on a plurality of adjacent cells. In such cases, since lights having different intensity distributions are emitted from the respective cells, the light intensity distributions on the irradiated surface become uniform as shown in FIG. 4B by superimposing the lights on the irradiated surface.

Figure 5A:
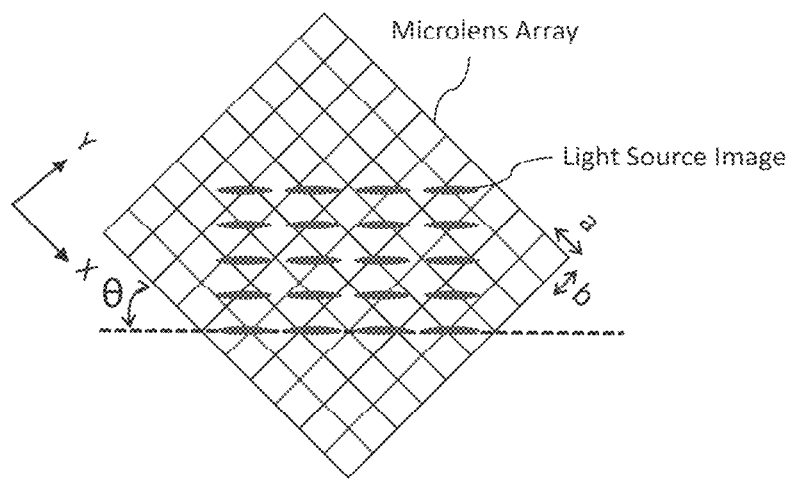
FIG. 5A is a schematic diagram showing another relationship example of the light source image and the microlens array of the first exemplary embodiment.
Figure 5B:
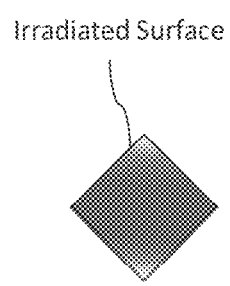
FIG. 5B is a schematic diagram showing an example of the light intensity distribution of the irradiated surface in the relationship between the light source image and the microlens array shown in FIG. 5A.

As shown in FIG. 5A, even if the diagonal direction of each cell is parallel to the directions of long axis and the short axis of the light source image which are incident on the microlens array, the lights from the light source are uniformly incident for each cell. As a result, the uniformity of the light intensity distribution on the irradiated surface decreases as shown in FIG. 5B. Therefore, it is desirable to arrange each microlens array so that the long axis direction of the light source image intersects with not only the direction of the boundary lines of the cells but also the direction of the diagonal lines of the cells.

As shown in FIG. 5A, in a plane consisting of X-axis and Y-axis, which are parallel to the boundary lines of the cells, orthogonal to each other, it is assumed that the length of the X-axis direction of each cell is a and the length of the Y-axis direction is b. The peak intensity of light in the irradiated surface with respect to the rotation angle of the microlens array (angle to the longitudinal direction of the light source image) θ will be shown in FIG. 6. It is assumed that a plurality of cells included in the microlens array are arranged in a lattice pattern.

Figure 6:
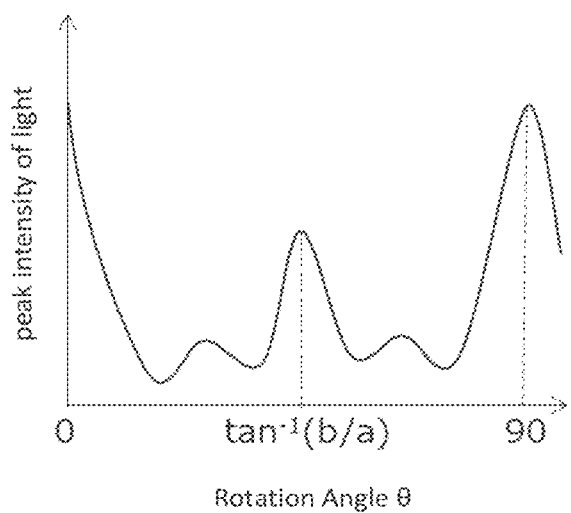
FIG. 6 is a graph showing an example of the peak intensity of light on the irradiated surface with respect to the rotation angle of the microlens array.

As shown in FIG. 6, when the rotational angle θ of the light source image is 0 degrees, 90 degrees and $\tan^{-1}(b/a)$, light having local peaks in the intensity distributions is irradiated to the irradiated surface. The rotation angle θ of the microarray lens is 0 degrees and 90 degrees means a case when the long axis direction of the light source image and the boundary lines of the cells of the light source image are parallel. The rotational angle θ of the microarray lens is $\tan^{-1}(b/a)$ means a case when the long axis direction of the light source image and the direction of the diagonal lines of the cells are parallel to each other.

Therefore, in order to make uniform the intensity distribution of the light on the irradiated surface, the rotational angle θ of the light source image is not set to 0 degrees, 90 degrees, $\tan^{-1}(b/a)$, and angles around them.

Specifically, it is desirable that the angle at which the long axis direction of the light source image for each LD and the direction of the boundary lines of the cells are intersected are 5 degrees or more. Similarly, it is desirable that the angle at which the long axis direction of the light source image for each LD and the direction of the diagonal lines of the cells are intersected are 5 degrees or more.

That is, the rotation angle θ of the microlens array with respect to the long axis direction of the light source image is desirable as follows:

$$5 \text{ degrees} \leq \theta \leq \tan^{-1}(b/a) - 5 \text{ degrees, or}$$

$$\tan^{-1}(b/a) + 5 \text{ degrees} \leq \theta \leq 85 \text{ degrees}.$$

For example, if each cell is square, the rotation angle θ of the microlens array with respect to the long axis direction of the light source image may be set in a range of 5 to 40 degrees or 50 to 85 degrees. When setting the rotation angle of the microlens array with respect to the short axis direction of the light source image, since the short axis direction of the light source image is a direction orthogonal to the long axis direction, an angle which is obtained by adding 90 degrees to the rotation angle θ of the long axis direction may be used.

When a plurality of light source images is arranged in a staggered manner as shown in FIG. 3 by using the light source device shown in FIG. 2, in addition to the short axis direction of each light source image shown by X and the long axis direction of each light source image shown by Y in FIG. 3, each light source image is also positioned periodically to the first and the second directions, which are different from the long axis direction and the short axis direction, in which a plurality of light source images shown by S1 and S2 are linearly arranged.

Therefore, when arranging a plurality of light source images in a staggered manner, each LD and microrange array are arranged so that the direction of the boundary lines of the cells intersects with the short axis direction of each light source image, the long axis direction of each light source image, and the first and second directions, respectively. Also, each LD and microrange array are arranged so that the direction of the diagonal lines of the cells intersects with the short axis direction of each light source image, the long axis direction of each light source image, and the first and second directions, respectively.

At this time, it is desirable that the angle at which the direction of the boundary lines of the cells intersects with the short axis direction of each light source image, the long axis direction of each light source image, and the first and second directions is 5 degrees or more. Also, it is desirable that the angle at which the direction of the diagonal lines of the cells intersects with the short axis direction of each light source image, the long axis direction of each light source image, and the first and second directions is 5 degrees or more.

When the light emitted by the three or more synthetic light source units are synthesized, each LD and microrange array are arranged so that the direction of the boundary lines or the direction of the diagonal lines of the cells intersects with the short axis direction of each light source image, the long axis direction of each light source image, as well as the directions in which a plurality of light source images of the others are linearly arranged.

If the cells are sufficiently large with respect to the size of the light source image on the irradiated surface of the microlens array, the probability that the light source image will be incident across a plurality of adjacent cells to the microlens array will be reduced. In that case, the light flux of the light source image to be incident on the microlens array is difficult to be divided by a plurality of cells, and even if the direction of the boundary lines or the direction of the diagonal lines of the cells and the long axis direction of the light source image are intersected, there is a possibility that the uniform light intensity distribution in the irradiated surface cannot be obtained. Therefore, it is desirable that the size of cell of the microlens array is sized so that the light source image on the irradiated surface of the microlens array is irradiated across a plurality of cells.

Figure 7A:
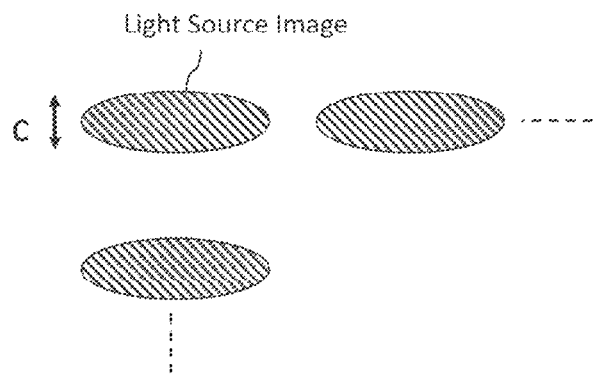
FIG. 7A is a schematic diagram showing an example of a definition of the size of the light source image.
Figure 7B:
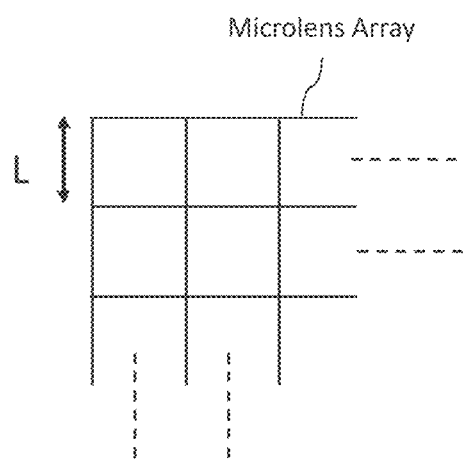
FIG. 7B is a schematic diagram showing an example of a definition of the size of the cells included in a microlens array.

For example, consider an example in which, as shown in FIG. 7A, the width of the short axis direction of the light source image which is incident on the microlens array is c, and in which, as shown in FIG. 7B, the length of the cells parallel to the short axis direction of the light source image is L.

If $L \leq 0.5c$, since the cells with respect to the size of the light source image can be said to be sufficiently small, without intersecting the direction of the boundary lines or the direction of the diagonal lines of the cells and the long axis direction of the light source image, the intensity distribution of the light in the irradiated surface becomes relatively uniform. Therefore, in the case of $L \leq 0.5c$, it may be not necessary that the direction of the boundary lines or the direction of the diagonal lines of the cells and the long axis direction of the light source image are intersected. Of course, even $L \leq 0.5c$, the direction of the boundary lines or the direction of the diagonal lines of the cells and the long axis direction of the light source image may be intersected. However, as described above, in the microlens array having small cells, since the edge sag easily occurs at the time of manufacturing, it is desirable that the length of L is 0.5c or more.

On the other hand, in the case of $L \leq 3.0c$, since the cells are said to be sufficiently large with respect to the size of the light source image, even if the direction of the boundary lines or the direction of the diagonal lines of the cells and the long axis direction of the light source image are intersected, there is a possibility that the intensity distribution of light in the irradiated surface will not be uniform.

Therefore, the optical system including the LD and the microlens array to which the first exemplary embodiment is applied may be designed such that $L \leq 3.0c$, and in particular, it is desirable to make a design such that $0.5c \leq L \leq 3.0c$.

In the above description, an example of a configuration in which a plurality of LDs is used as light sources has been described, but the number of LDs may be one. If a plurality of LDs is used as a light source, since the light source image is incident divided in various patterns for each cell of the microlens array, the effect of the present invention is more easily obtained.

In the first exemplary embodiment, since each LD and the microlens array should be arranged so that the direction of the boundary lines or the direction of the diagonal lines of the cells and the long axis direction of the light source image are intersected, a configuration in which each LD intersects with both directions of the above second axis and the third axis is conceivable.

However, in the light source device for the excitation light shown in FIGS. 1 and 2, when each LD is arranged to intersect with both directions of the above second axis and the third axis, the structural problems to the mechanism and the apparatus associated with the light source device are increased.

In recent years, a high brightness projector capable of projecting brighter images has been desired to meet various usage environments. Therefore, for example, as in the configuration shown in FIG. 2, when the number of LDs used as a light source for excitation light for irradiating the phosphor is increased, the number of heat sink for cooling each LD is increased or is grown to a large size, the number of power cords for supplying power to each LD also increases, thereby the entire light source device becomes large. Therefore, the structural problems to the mechanism and apparatus associated with the light source device are further increased.

On the other hand, in the configuration in which microlens array intersects with both directions of the above second axis and the third axis, the excitation light is irradiated, being inclined, to the phosphor surface (irradiated surface) as shown in FIG. 4B. However, if the phosphor can be irradiated with light in a required area, it is not particularly a problem even if the phosphor is irradiated with the inclined exciting light as shown in FIG. 4B.

Therefore, in the first exemplary embodiment, the light source is arranged so that the long axis direction of the light source image on the irradiated surface of the microlens array intersects with both of the two directions of each cell, and the microlens array is arranged so that the two directions in which the cells are aligned intersect with both directions of the second axis and the third axis, respectively.

According to the first exemplary embodiment, the light source is arranged so that the long axis direction of the light source image on the irradiated surface of the microlens array intersects with both of the two directions of each cell, and the microlens array is arranged so that the two directions in which the cells are aligned intersect with both directions of the second axis and the third axis, respectively. Thus, lights having different intensity distributions are emitted from each cell, and the lights are superimposed on the phosphor surface which is the irradiated surface, so that the intensity distribution of the light on the phosphor surface becomes uniform.

Therefore, the non-uniformity of the light intensity distribution caused by the shape of the light source image in the phosphor surface can be improved.

Further, because each LD is not arranged to intersect with both directions of the second axis and the third axis, but the microlens array is arranged so that the two directions in which the cells are aligned intersect with both directions of the second axis and the third axis, respectively, the structural problems to the mechanism and apparatus associated with the light source device for excitation light including the LD are reduced.

Therefore, the non-uniformity of the light intensity distribution in a specific irradiated surface caused by the shape of the light source image can be improved while reducing structural problems.

Second Exemplary Embodiment

Figure 8:
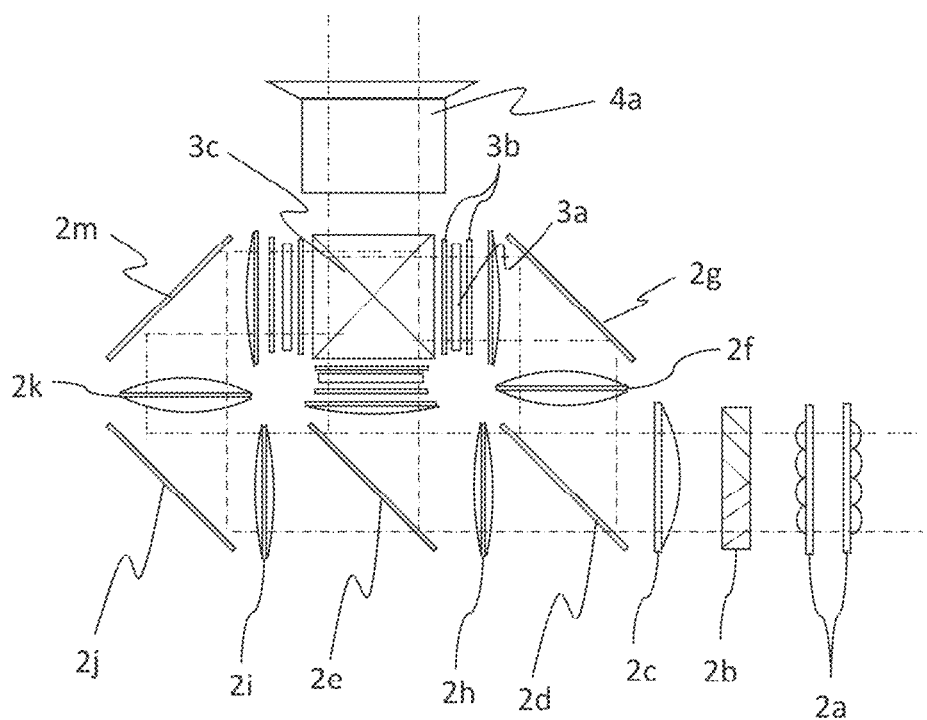
FIG. 8 is a schematic view showing an example of a configuration of an illumination projection optical system included in the projector.

FIG. 8 is a schematic diagram showing an example of a configuration of an illumination projection optical system included in a projector.

Light emitted from the light source device shown in FIG. 1 or FIG. 2 is input to the illumination projection optical system shown in FIG. 8. As shown in FIG. 8, the illumination projection optical system includes illumination optical system 2, light modulator 3 and projection optical system 4. FIG. 8 shows a configuration example of an illumination projection optical system using a liquid crystal panel as an image forming element included in optical modulating unit 3. The present invention is also applicable to a configuration in which the DMD is used as an image forming element.

Illumination optical system 2 includes integrator 2a, polarizing beam splitter 2b, lens 2c, first dichroic mirror 2d, second dichroic mirror 2e, first relay lens 2f, first mirror 2g, second relay lens 2h, third relay lens 2i, second mirror 2j, fourth relay lens 2k and third mirror 2m.

Integrator 2a converts the light emitted from the light source device into light having a uniform intensity distribution in the irradiated surface (liquid panel surface). For example, a pair of two fly-eye lenses may be used as integrator 2a. The fly-eye lens has a configuration in which a plurality of microlenses (cells) are arranged in two directions orthogonal to each other, and is similar to microlens arrays 12 and 13, and microlens arrays 24 and 25 shown in the first exemplary embodiment.

Polarizing beam splitter 2b uniforms polarization of light emitted from integrator 2a and outputs the light. Light output from polarizing beam splitter 2a is incident on first dichroic mirror 2d by lens 2c.

First dichroic mirror 2d, for example, passes through green light and blue light and reflects red light. Red light reflected by first dichroic mirror 2d is incident on first mirror 2g by first relay lens 2f, and is incident on optical modulating unit 3 by reflecting first mirror 2g. Green light and blue light passed through first dichroic mirror 2d are incident on second dichroic mirror 2e by second relay lens 2h.

Second dichroic mirror 2e, for example, passes through blue light and reflects green light. Green light reflected by second dichroic mirror 2e is incident on optical modulating unit 3. Blue light passed through second dichroic mirror 2e is incident on second mirror 2j by third relay lens 2i.

Second mirror 2j reflects the blue light which is incident, and the reflected blue light is incident on third mirror 2m by fourth relay lens 2k. Third mirror 2m is incident on optical modulating unit 3 by reflecting the blue light which is incident.

Optical modulating unit 3 includes liquid crystal panel 3a which is an image forming device, polarizing plate 3b and cross prism 3c.

Each color light separated by illumination optical system 2 is incident through polarizing plate 3b to liquid crystal panel 3a prepared for each R (red)/G (green)/B (blue), respectively and is optical modulated based on the video signal. Each color light (image light) that is formed by being optical modulated is synthesized by cross prism 3c, and is projected as an image on a screen or the like (not shown) through projection optical system 4 having projection lens 4a.

In such a configuration, similarly to the first exemplary embodiment, a coordinate system is set that includes: a first axis parallel to the principal ray of the laser light which is incident on the microlens array; a second axis in a direction orthogonal to the first axis, in a direction in which the laser light emitted from the microlens array is reflected; and a third axis orthogonal to the first axis and the second axis, respectively. In the example shown in FIG. 9A, for example, the first axis is the Z axis, the second axis is the X axis, and the third axis is the Y axis. Then, in the second exemplary embodiment, a light source is arranged so that the long axis direction of the light source image on the irradiated surface of the microlens array intersects with both two directions of each cell, and microlens array is arranged so that the two directions in which cells are aligned are parallel to the directions of the second axis and the third axis, respectively.

Figure 9A:
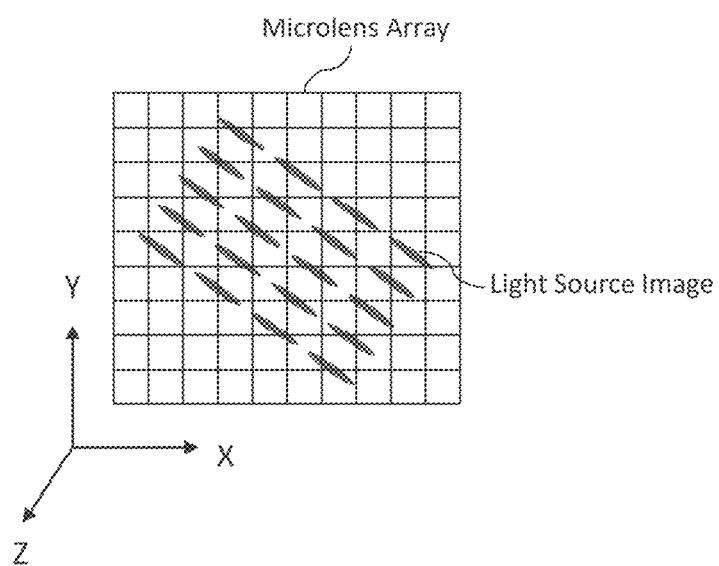
FIG. 9A is a schematic diagram showing an example of the relationship between the light source image and the microlens array of the second exemplary embodiment.

For example, in the configuration shown in FIG. 8, the microlens array (integrator 2a) is arranged so that one of the boundary lines of the plurality of cells is parallel to the X-axis shown in FIG. 9A. And, each LD, which is included in color synthesis system 16 or 28 (see FIGS. 1 and 2), is arranged so that the direction of the boundary lines of the cells of the microlens array (integrator 2a) and the long axis direction of the light source image are intercected.

Similar to the first exemplary embodiment, each LD, which is included in color synthesizing system 16 or 28 (see FIGS. 1 and 2), is arranged so that the direction of the diagonal lines of the cells of the microlens array and the long axis direction of the light source image are intersected.

At this time, in order to make uniform the intensity distribution of light in the irradiated surface, similarly to the first exemplary embodiment, it is desirable that an angle at which the direction of the boundary lines of the cells and the long axis direction of the light source image are intersected is 5 degrees or more. Also, it is desirable that an angle at which the direction of the diagonal lines of the cells and the long axis direction of the light source image are intersected is 5 degrees or more.

Furthermore, when a plurality of light source images is arranged in a staggered manner, each LD, which is included in color synthesis system 16 or 28 (see FIGS. 1 and 2), is arranged to the cells alignments so that the direction of the boundary lines of the cells and the short axis direction of each light source image are intersected, and the long axis direction of each light source image and a direction in which a plurality of light source images of the others are linearly arranged, respectively. Or, when a plurality of light source images is arranged in a staggered manner, each LD, which is included in color synthesis system 16 or 28 (see FIGS. 1 and 2), is arranged to the cells alignments so that the direction of the diagonal lines of the cells intersects with the short axis direction of each light source image, the long axis direction of each light source image and a direction in which a plurality of light source images of the others are linearly arranged, respectively.

At this time, it is desirable that an angle at which the direction of the boundary lines of the cells intersects with the short axis direction of the light source image, the long axis direction of the light source image and a direction in which a plurality of light source images of the others are linearly arranged is 5 degrees or more. Or, it is desirable that an angle at which the direction of the diagonal lines of the cells intersects with the short axis direction of each light source image, the long axis direction of each light source image and a direction in which a plurality of light source images of the others are linearly arranged is 5 degrees or more.

Figure 9B:
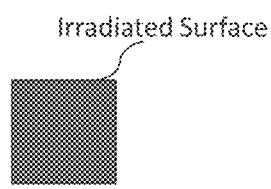
FIG. 9B is a schematic diagram showing an example of the light intensity distribution of the irradiated surface in the relationship between the light source image and the microlens array shown in FIG. 9A.
Figure 10:
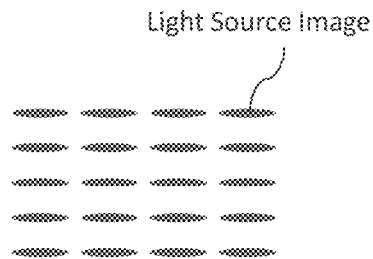
FIG. 10 is a schematic diagram showing an example of a light source image formed by a laser light.
Figure 11A:
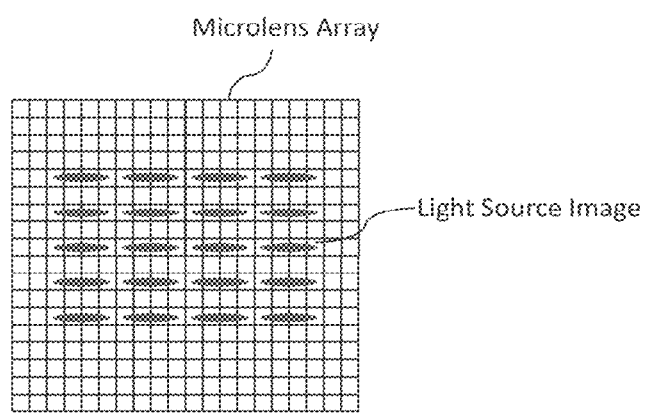
FIG. 11A is a schematic diagram showing an example of the relationship between the light source image and the microlens array of the background art.
Figure 11B:
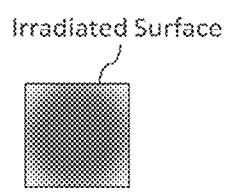
FIG. 11B is a schematic diagram showing an example of the light intensity distribution of the irradiated surface in the relationship between the light source image and the microlens array shown in FIG. 11A.

According to the second exemplary embodiment, a light source is arranged so that the long axis direction of the light source image on the irradiated surface of the microlens array intersects with both two directions of each cell, and microlens array is arranged so that the two directions in which cells are aligned are parallel to the directions of the second axis and the third axis, respectively. Thus, similarly to the first exemplary embodiment, the light having uniform intensity distribution is incident to a predetermined irradiated surface (liquid crystal panel surface) (see FIG. 9B). Since the relationship between the other microlens arrays and the LD is the same as that in the first exemplary embodiment, the description thereof is omitted.

In the second exemplary embodiment, as in the first exemplary embodiment, since the LD and the microlens array should be arranged so that the direction of the boundary lines or the diagonal lines of the cells and the long axis direction of the light source image are intersected, a configuration, in which microlens array is arranged so that the direction in which the cells are aligned and both directions of the second axis and the third axis are intersected, is conceivable.

However, when the microlens array is arranged so that the direction in which the cells are aligned intersects with the directions of the second axis and the third axis, as shown in FIG. 4B, the light emitted from the microlens array is irradiated which is inclined with respect to the irradiated surface (liquid crystal panel surface). In the illumination projection optical system shown in FIG. 8, since the microlens array (integrator 2a) and the liquid crystal panel 3a which is a video forming element are in conjugate relationship, when the light emitted from the microlens array is inclined, many optical components that are present on the subsequent optical path also need to incline at the same angle as the microlens array. In this case, the projection image projected from the projection lens 4a is also inclined.

On the other hand, since color synthesizing system 16 shown in FIG. 1 or color synthesizing system 28 shown in FIG. 2 only generates color light (e.g., blue light) required for synthesizing white light, it is not necessary to increase the light power compared to the excitation light irradiated to the phosphor. Therefore, color synthesis systems 16 and 28 can decrease the number of LDs compared to the light source device for generating the excitation light, and can be formed relatively small.

Therefore, in the second exemplary embodiment, the light source is arranged so that the long axis direction of the light source image on the irradiated surface of the microlens array intersects with both two directions of each cell, and the microlens array is arranged so that the direction in which the cells are aligned is parallel to the directions of the second axis and the third axis.

In a configuration in which color synthesis system 16 shown in FIG. 1 or color synthesis system 28 shown in FIG. 2 is used to generate color light (e.g., blue light) required for the synthesis of white light, the light power output from color synthesis system 16 or 28 can be adjusted. Therefore, the color balance of the projected image can be adjusted, and the color balance can be corrected even if the color balance of the projected image fluctuates due to a decrease in the light power output from the phosphor by using the projector for a long period of time.

According to the second exemplary embodiment, the light source is arranged so that the long axis direction of the light source image on the irradiated surface of the microlens array intersects with both the two directions of each cell, and microlens array is arranged so that the two directions in which cells are aligned are parallel to the directions of the second axis and the third axis, respectively. Thus, lights having different intensity distributions are emitted from each cell, and the lights are superimposed on the phosphor surface, which is the irradiated surface, so that the intensity distribution of the light on the phosphor surface becomes uniform.

Therefore, the non-uniformity of the light intensity distribution caused by the shape of the light source image in a specific irradiated surface can be improved.

Furthermore, because the microlens array is not arranged to intersect with both directions of the above second axis and the third axis, but the microlens array is arranged so that the two directions in which the cells are aligned are parallel to both directions of the second axis and the third axis, respectively, the structural problems to the mechanism and apparatus associated with the light source device for excitation light including the LD are reduced.

Therefore, the non-uniformity of the light intensity distribution in a specific irradiated surface caused by the shape of the light source image can be improved while reducing structural problems.

Note that the projector may include either one of the light source device described in the first exemplary embodiment and the configuration described in the second exemplary embodiment, or may include both the light source devices described in the first exemplary embodiment and the configuration described in the second exemplary embodiment. If the projector includes both the light source device shown in the first exemplary embodiment and the configuration shown in the second exemplary embodiment, the light source and the microlens array shown in the first and second exemplary embodiments are arranged so that the long axis direction of the light source image and the directions in which the cells are aligned are intersected shown in the first exemplary embodiment, and so that the long axis direction of the light source image and the directions in which the cells are aligned are intersected shown in the second exemplary embodiment.

Although the present invention has been described above with reference to the exemplary embodiments, the present invention is not limited to the above-described exemplary embodiments. Various modifications that can be understood by a person having ordinary skilled in the art within the scope of the present invention are possible in the configuration and details of the present invention.

The invention claimed is:

1. A light source device for generating excitation light that is irradiated to a phosphor, comprising:
    a plurality of light sources that emits laser light; and
    a microlens array that comprises a plurality of microlenses arranged in two directions orthogonal to each other, wherein the laser light emitted from the light source is incident on the microlens array and exits the microlens array as output light, and that irradiates the phosphor with the output light as an excitation light, wherein:
    the light source image of the light source on an irradiated surface of the microlens array is elliptical;
    a long axis direction of the light source image intersects with both the two directions; and
    in a coordinate system comprising: a first axis that is parallel to a principal ray of the laser light incident on the microlens array; a second axis, in a direction in which the laser light emitted from the microlens array or the fluorescence emitted from the phosphor is reflected, that is an orthogonal direction to the first axis; and a third axis that is orthogonal to the first axis and the second axis, respectively,
    the two directions intersect with the direction of the second axis and the direction of the third axis, respectively,
    wherein when a width of a short axis direction of the light source image is c, and a length of a microlens of the microlens array parallel to the short axis direction of the light source image is L,
    $L \leq 3.0c$.

2. A light source device for generating incident light of a microlens array that comprises a plurality of microlenses arranged in two directions orthogonal to each other and that irradiates an image forming device, that performs optical modulation, with the output light, the light source device comprising:
    a plurality of light sources that emits laser light, wherein:
    the light source image of the light source on an irradiated surface of the microlens array is elliptical;
    a long axis direction of the light source image intersects with both the two directions; and
    in a coordinate system comprising: a first axis that is parallel to a principal ray of the laser light incident on the microlens array; a second axis, in a direction in which the laser light emitted from the microlens array that is an orthogonal direction to the first axis; and a third axis that is orthogonal to the first axis and the second axis, respectively,
    the two directions are parallel to the direction of the second axis or the direction of the third axis, respectively,
    wherein when a width of a short axis direction of the light source image is c, and a length of a microlens of the microlens array parallel to the short axis direction of the light source image is L,
    $L \leq 3.0c$.

3. The light source device according to claim 1, wherein said microlens array comprises a configuration in which a plurality of the microlenses are arranged in a lattice pattern.

4. The light source device according to claim 1, wherein a microlens of the microlens array has a rectangular shape, and a long axis direction of the light source image and a direction of diagonal lines of the microlens are intersected.

5. The light source device according to claim 4, wherein an angle at which the long axis direction of the light source image and the direction of the diagonal lines of the microlens are intersected is 5 degrees or more.

6. The light source device according to claim 1, wherein an angle at which the long axis direction of the light source image and the direction in which the microlenses are aligned are intersected is 5 degrees or more.

7. The light source device according to claim 1, wherein a plurality of laser lights is emitted from the light source, and a plurality of the light source images on the irradiated surface of the microlens array are arranged in a lattice pattern.

8. The light source device according to claim 1, wherein:
    a plurality of laser lights is emitted from the light source;
    a plurality of light source images on the irradiated surface of the microlens array are arranged in a staggered manner; and
    a direction, in which a plurality of the light source images is linearly arranged and a direction in which the microlenses are aligned are intersected, the direction being different from a long axis direction and a short axis direction of the light source images.

9. The light source device according to claim 1, wherein when a width of the short axis direction of the light source image is c, and the length of the microlens of the microlens array parallel to the short axis direction of the light source image is L,
    $0.5c \leq L \leq 3.0c$.

10. A light source device for generating incident light of a first microlens array that comprises a plurality of microlenses arranged in a first direction and a second direction orthogonal to each other and that irradiates an image forming device, that performs optical modulation, with the output light, the light source device comprising:
    a plurality of first light sources that emits laser light and that irradiates the first microlens array with the output light;
    a plurality of second light sources that emits laser light; and
    a second microlens array that comprises a plurality of microlenses arranged in a third direction and a fourth direction orthogonal to each other, and that is irradiated the laser light emitted from the second light source, and that irradiates a phosphor with the output light, wherein:
    the light source image of the first light sources on the irradiated surface of the first microlens array is elliptical;
    a long axis direction of the light source image of the first light source intersects with both the first direction and the second direction;
    the light source image of the second light source on the irradiated surface of the second microlens array is elliptical;

the long axis direction of the light source image of the second light source intersects with both the third direction and the fourth direction; and the first direction and the second direction intersect with both the third direction and the fourth direction, wherein when a width of a short axis direction of the light source image is c, and a length of a microlens of the first microlens array parallel to the short axis direction of the light source image is L, $L \leq 3.0c$.

* * * * *